United States Patent
Wessling et al.

(10) Patent No.: US 6,718,776 B2
(45) Date of Patent: Apr. 13, 2004

(54) PASSIVE THERMAL CONTROL ENCLOSURE FOR PAYLOADS

(75) Inventors: Francis C. Wessling, Huntsville, AL (US); James M. Blackwood, Huntsville, AL (US); Gabrial A. Elliott, Huntsville, AL (US); Susan K. O'Brien, Gurley, AL (US)

(73) Assignee: University of Alabama in Huntsville, Huntsville, AL (US)

(*) Notice: Subject to any disclaimer, the term of this patent is extended or adjusted under 35 U.S.C. 154(b) by 0 days.

(21) Appl. No.: 10/192,371

(22) Filed: Jul. 10, 2002

(65) Prior Publication Data

US 2003/0010041 A1 Jan. 16, 2003

Related U.S. Application Data

(60) Provisional application No. 60/304,373, filed on Jul. 10, 2001.

(51) Int. Cl.[7] .............................. F25D 3/08; B65B 63/08
(52) U.S. Cl. .......................................... 62/60; 62/457.2
(58) Field of Search ........................... 62/60, 337, 371, 62/440, 441, 442, 443, 444, 446, 447, 449, 451, 465, 457.2

(56) References Cited

U.S. PATENT DOCUMENTS

| | | | |
|---|---|---|---|
| 5,343,368 A | * | 8/1994 | Miller .......................... 362/32 |
| 5,488,333 A | * | 1/1996 | Vig .............................. 331/66 |
| 5,943,876 A | | 8/1999 | Meyer et al. |
| 6,164,030 A | | 12/2000 | Dietrich |
| 6,192,703 B1 | | 2/2001 | Salyer et al. |
| 6,325,281 B1 | | 12/2001 | Grogan |
| 6,397,620 B1 | | 6/2002 | Kelly et al. |
| 6,405,556 B1 | | 6/2002 | Bucholz |
| 6,560,383 B1 | * | 5/2003 | Nystrom ....................... 385/16 |

* cited by examiner

*Primary Examiner*—Denise L. Esquivel
*Assistant Examiner*—Malik N. Drake
(74) *Attorney, Agent, or Firm*—Alston & Bird LLP

(57) ABSTRACT

A passive thermal control enclosure for transporting and storing payloads in earth orbit includes an inner box-like enclosure surrounded by an outer box-like enclosure with insulation in the space between the enclosures. The walls of the inner enclosure are fiber-matrix composite skins with honeycomb sandwiched therebetween. Each enclosure has its own door latched closed by releasable latches formed in opposed pairs that can be operated without any net force on the operator. Packs of phase change material (PCM) are placed into the inner enclosure with the payload. The PCM is contained in flexible packages. The packs of PCM are removed when they melt and replaced with fresh packs, and the melted packs preferably are re-frozen on-board the orbiting spacecraft. Freezing preferably is carried out such that the freeze front moves substantially in only one direction from one end of the pack to the other.

31 Claims, 12 Drawing Sheets

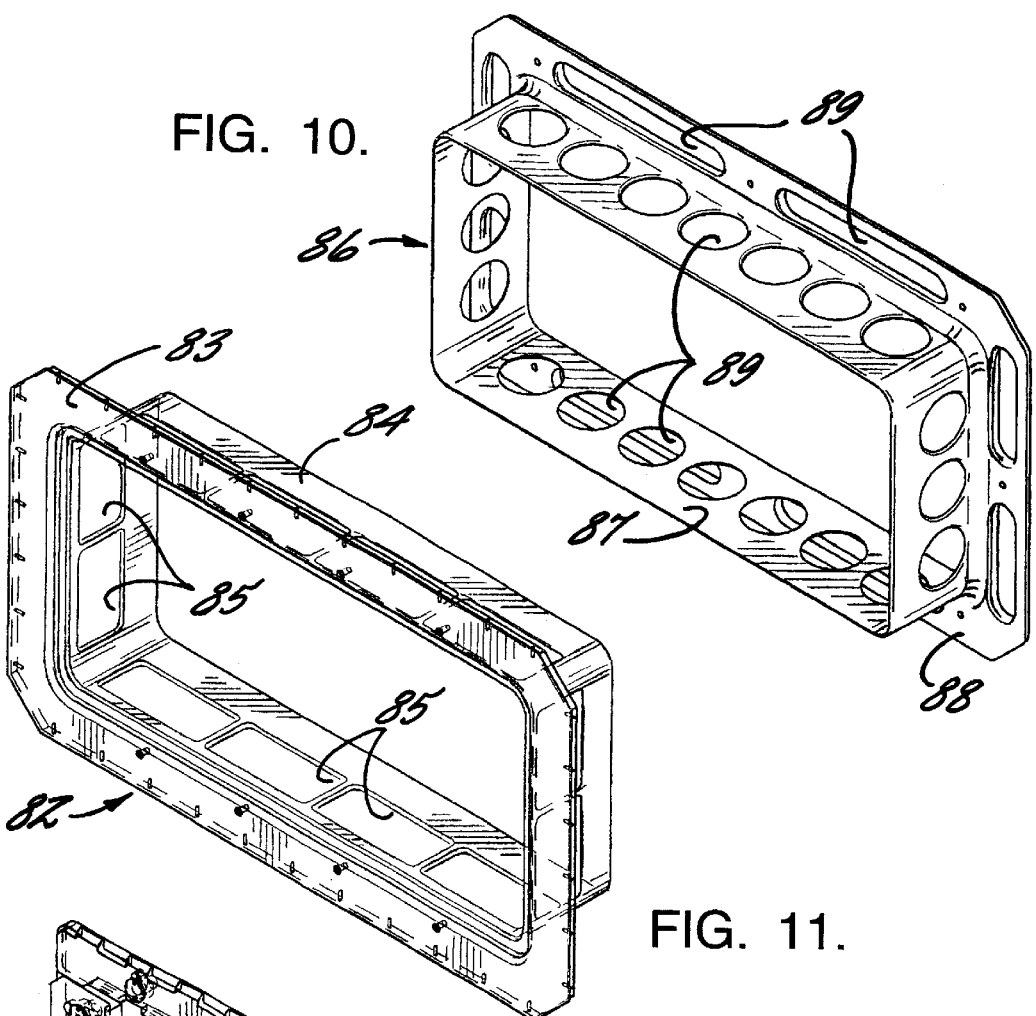
FIG. 10.
FIG. 11.
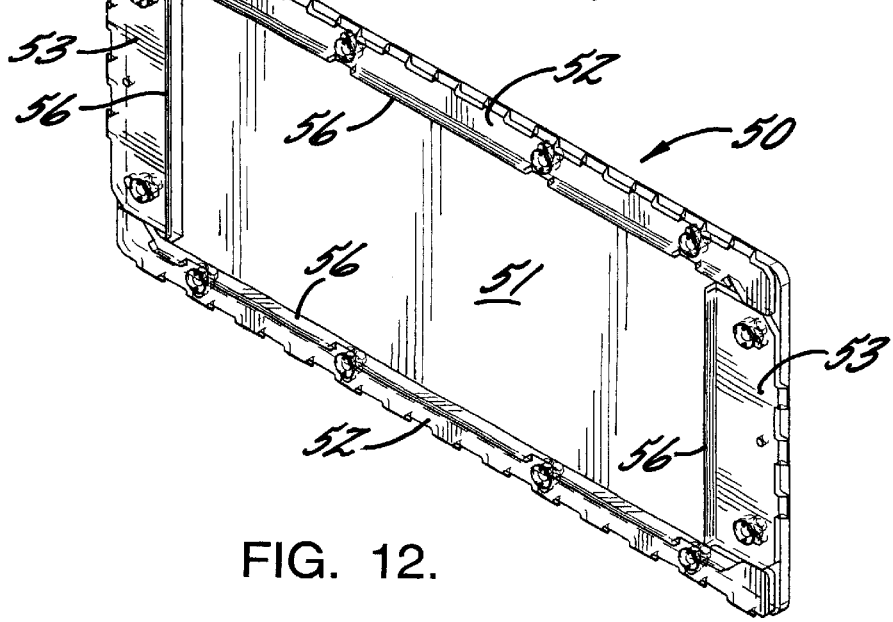
FIG. 12.

SEE FIG. 24.

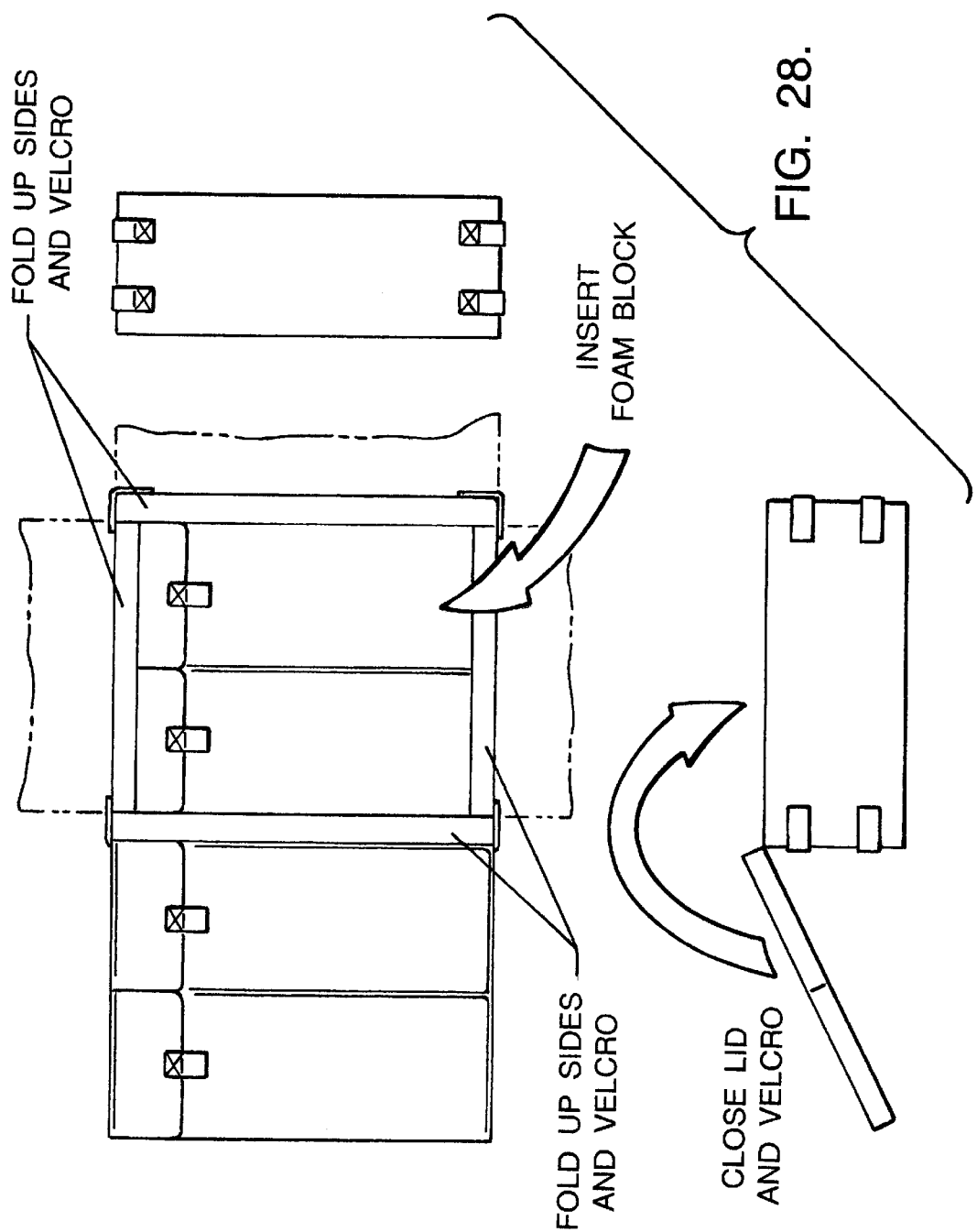

US 6,718,776 B2

PASSIVE THERMAL CONTROL ENCLOSURE FOR PAYLOADS

CROSS-REFERENCE TO RELATED APPLICATION

This application claims the benefit of the filing date of U.S. Provisional Patent Application Ser. No. 60/304,373 filed Jul. 10, 2001.

FIELD OF THE INVENTION

The invention relates to passive thermal control enclosures for controlling the temperature of the contents of the enclosure, and in particular aspects relates to such enclosures for payloads transported into earth orbit.

BACKGROUND OF THE INVENTION

There are a number of situations in which thermal control of materials and objects of various types is required for substantial periods of time. Payloads, especially scientific experiments, transported and stored on-orbit on the Space Shuttle and International Space Station (ISS), are subjected to a series of severe environmental conditions (vibration, shock, temperature variations, pressure variations, etc.). For human space-flight, there are a number of constraints and requirements that limit the materials, configuration, etc., associated with cargo. Cost, power availability, limitations on available space, and the need for minimum crew time and effort, are also factors that must be considered.

Providing a controlled temperature for various payloads, especially experiments, in a secure, light-weight container is a critical need.

There are a number of refrigerator/freezer designs that have been developed and used on the Shuttle Orbiter, Spacelab, and Spacehab, and additional units that are being readied for the ISS. However, the power, mass, thermal control (waste heat removal) and special access provisions associated with these designs can be highly limiting to their application. For example, for the Orbiter, there are periods when power and waste heat removal are not available for the refrigerator/freezers (e.g., periods of several hours before, and during, ascent and descent). There are also limitations on where these refrigerator/freezers can be located on the ISS. For example, only powered ISPRs can be used for these units.

There are situations in which materials and objects must be transported on Earth under constant, controlled temperature conditions with little or no access to power and waste heat removal. These instances include transport of biological specimens, including tissue and blood, pharmaceuticals, etc. The types of refrigerator/freezers or insulation containers used for terrestrial applications are completely unsuitable for space applications, due to their design limitations.

Payload transport also is limited by the Space Shuttle and ISS facilities, which are severely limited and heavily subscribed. Mass constraints are also an important issue, and due to the high inclination orbit of the ISS, much of the carrier capacity for the Shuttle racks and lockers cannot be fully utilized, which further constrains the use of refrigerator/freezers requiring special attachments, power, waste heat removal, and health monitoring instrumentation.

The only known passive containers that can be used for transporting and stowing substantial amounts of materials and/or payloads are unpowered lockers and soft stowage bags used for transporting various articles that do not require temperature control. There are no known passive control containers with substantial cargo volumes (of the order of a Mid-deck Locker Equivalent) for the ISS and Shuttle. Existing passive temperature-control containers are limited to small dewars, used to transport or store small quantities of material.

The refrigerator/freezers for the Space Shuttle and ISS have substantial usable volume, but they require power, and thus must be placed in special powered racks with waste heat removal capabilities. These, and other factors, limit the use of such active refrigerator/freezers.

SUMMARY OF THE INVENTION

The present invention addresses the above needs and achieves other advantages by providing a passive, low-cost, safe, and secure controlled-temperature carrier suitable especially for transporting payloads to orbit and conducting long-term experiments requiring stowage for total mission periods of hundreds of hours. Minimal effort is required of the astronauts or ground crew to service and maintain the unit. The unit is capable of holding essentially the same, or greater, volumes and masses as other powered refrigerator/freezers in the NASA inventory, and it can achieve constant temperatures over a wide temperature range (−20 C. to +40 C.), through choice of an appropriate phase change material (PCM).

A passive thermal control enclosure in accordance with one preferred embodiment of the invention comprises:

an inner enclosure having a plurality of walls joined together to form a generally box-shaped configuration, the inner enclosure having an opening at one end thereof, the walls of the inner enclosure comprising a rigid structural material and at least some of the walls also including a thermally insulating material;

an outer enclosure having a plurality of walls joined together to form a generally box-shaped configuration surrounding the inner enclosure such that there is a space between each wall of the inner enclosure and a corresponding wall of the outer enclosure, the outer enclosure having an opening at one end thereof in registration with the opening in the inner enclosure for inserting items into and removing items from the inner enclosure;

an inner door releasably engaged with the inner enclosure for closing the opening therein, and an outer door releasably engaged with the outer enclosure for closing the opening therein;

a thermally insulating body disposed in the space between each wall of the inner enclosure and the corresponding wall of the outer enclosure, each thermally insulating body comprising a plurality of insulators stacked together to provide redundancy such that if one insulator loses its insulating ability there is at least one other insulator for insulating the corresponding wall of the inner enclosure; and at least one sealed pack of phase change material disposed inside the inner enclosure.

Preferably, the insulators between the inner and outer enclosures each comprises a vacuum-sealed flexible package filled with an insulating material. The insulating material in the insulators preferably comprises an aerogel, and more preferably is a carbon and silica aerogel.

In a preferred embodiment, the walls of the inner enclosure comprise fiber-matrix composite material. More particularly, preferably the top, bottom, and side walls of the inner enclosure each comprises a sandwich structure having fiber-matrix composite skins between which a core of thermally insulating material is disposed. The core of thermally insulating material preferably comprises a honeycomb material.

The inner enclosure preferably includes a latch assembly for latching the inner door closed. The preferred latch assembly comprises a pair of sliding latches that slide in opposite directions from each other for latching the inner door.

The outer enclosure preferably includes a pressure equalization vent allowing gases to pass into and out from the space between the inner and outer enclosures. The vent prevents liquids from passing therethrough.

A preferred pack of phase change material comprises a quantity of phase change material contained within a sealed first package, and a sealed second package that contains the first package. Various phase change materials can be selected depending on the required temperature at which the payload is to be maintained, and other factors. Deuterium oxide, water, various paraffins, and TEA-16 are suitable choices.

In accordance with another aspect of the invention, a passive thermal control enclosure comprises:

an inner enclosure;

an outer enclosure surrounding the inner enclosure such that a space exists between the inner enclosure and the outer enclosure; and insulators disposed between the inner and outer enclosures, the insulators each comprising an aerogel material contained within a vacuum-sealed flexible package.

In accordance with still another aspect of the invention, a passive thermal control enclosure for use in microgravity comprises:

an inner enclosure of generally box-shaped configuration having an opening at one end thereof;

an outer enclosure of generally box-shaped configuration having an opening at one end thereof, the inner enclosure being disposed inside the outer enclosure such that the openings of the two enclosures are in registration with each other;

thermal insulators disposed between the inner and outer enclosures;

an inner door releasably engageable with the inner enclosure for closing the opening thereof, and an outer door releasably engageable with the outer enclosure for closing the opening thereof; and latches for at least one of the inner and outer doors, the latches being configured such that the latches are movable between latched and unlatched positions by application of force pairs exerted in opposite directions such that substantially no net reaction force is exerted on the person applying the force pairs.

A passive thermal control enclosure in accordance with yet another aspect of the invention comprises:

an inner enclosure;

an outer enclosure surrounding the inner enclosure such that a space exists between the inner enclosure and the outer enclosure;

insulators disposed between the inner and outer enclosures; and sealed packs of phase change material disposed within the inner enclosure for surrounding a payload to be temperature-controlled, the phase change material comprising deuterium oxide.

The invention also encompasses a method for transporting a temperature-sensitive payload between earth and a spacecraft in orbit about earth and for storing the payload on the spacecraft. The method comprises:

placing the payload in a passive thermal control enclosure containing sealed packs of phase change material having a phase transition temperature generally corresponding to a temperature at which the payload is to be maintained;

transporting the passive thermal control enclosure containing the packs of phase change material and the payload to the spacecraft and transferring the passive thermal control enclosure to a storage area in the spacecraft; and when a substantial fraction of the phase change material has changed phase, removing the packs of phase change material from the passive thermal control enclosure and inserting fresh packs of the phase change material into the enclosure.

Preferably, the packs of phase change material are initially placed into the thermal control enclosure in a frozen state and are removed when a substantial fraction of the phase change material has melted, and the melted packs of phase change material are refrozen onboard the spacecraft. The step of re-freezing the packs of phase change material preferably comprises cooling each pack such that the phase change material freezes along a freeze front that travels in substantially only one direction. The phase change material preferably is packaged in flexible packages to accommodate expansion of the phase change material during re-freezing.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 10 is a perspective view of a back support portion of the inner enclosure;

FIG. 11 is a perspective view of a front support portion of the inner enclosure;

FIG. 12 is a perspective view of the inner door of the passive thermal control enclosure;

FIG. 28 shows the webbing being folded to form a box-like configuration.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
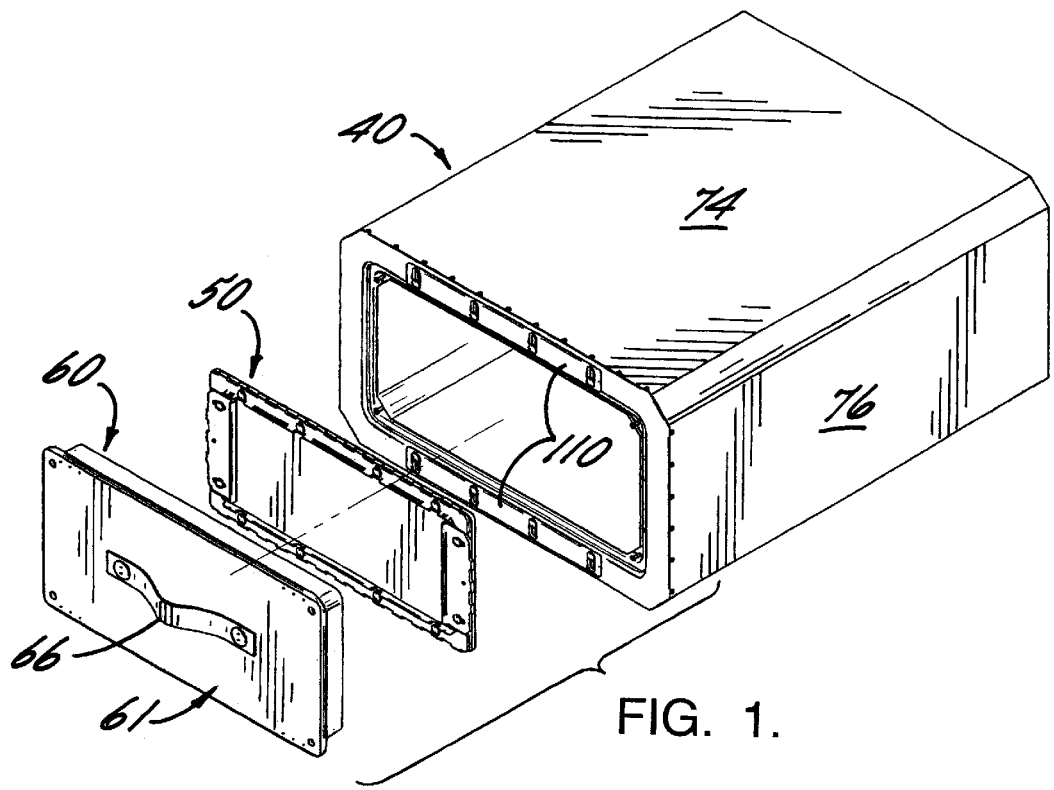
FIG. 1 is a perspective view of a passive thermal control enclosure in accordance with one preferred embodiment of the invention.
Figure 2:
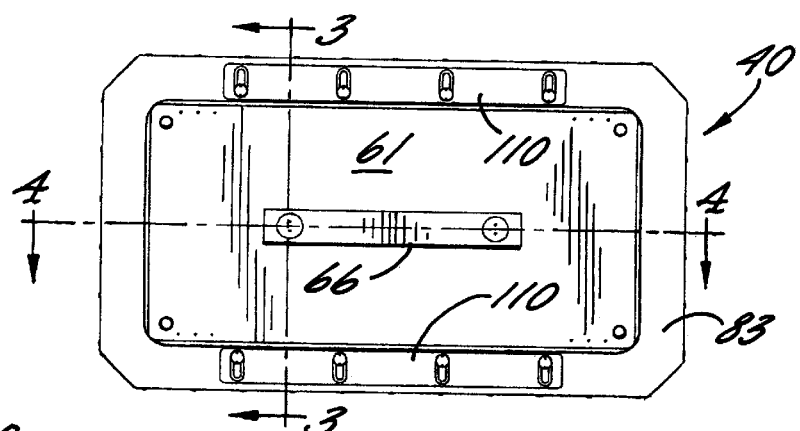
FIG. 2 is a front elevation of the thermal control enclosure.
Figure 3:
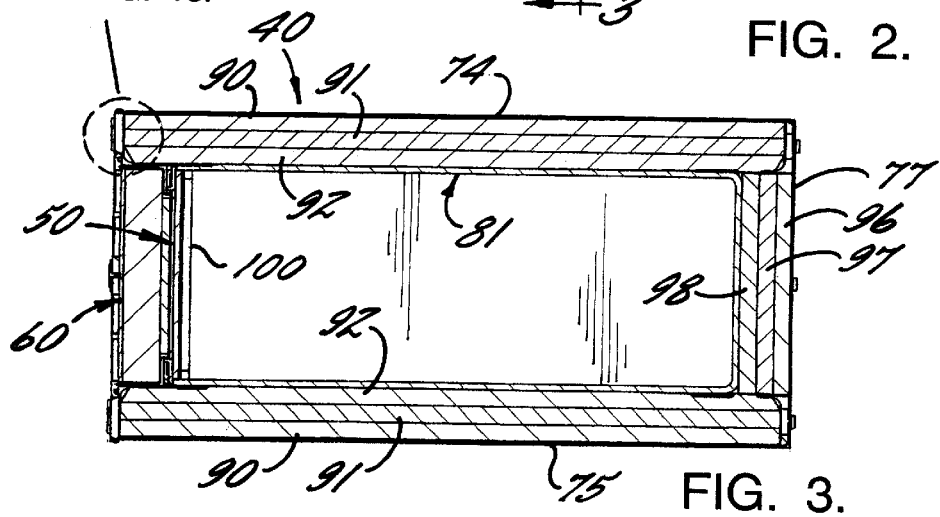
FIG. 3 is a cross-sectional view taken along line 3—3 of FIG. 2.
Figure 4:
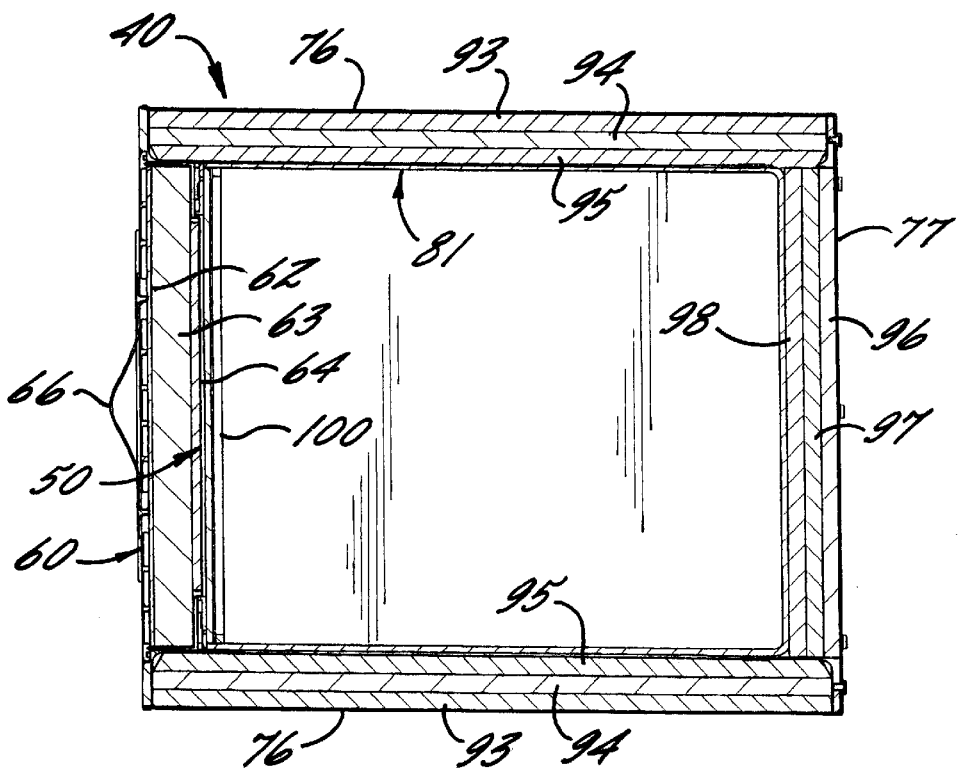
FIG. 4 is a cross-sectional view taken along line 4—4 of FIG. 2.
Figure 5:
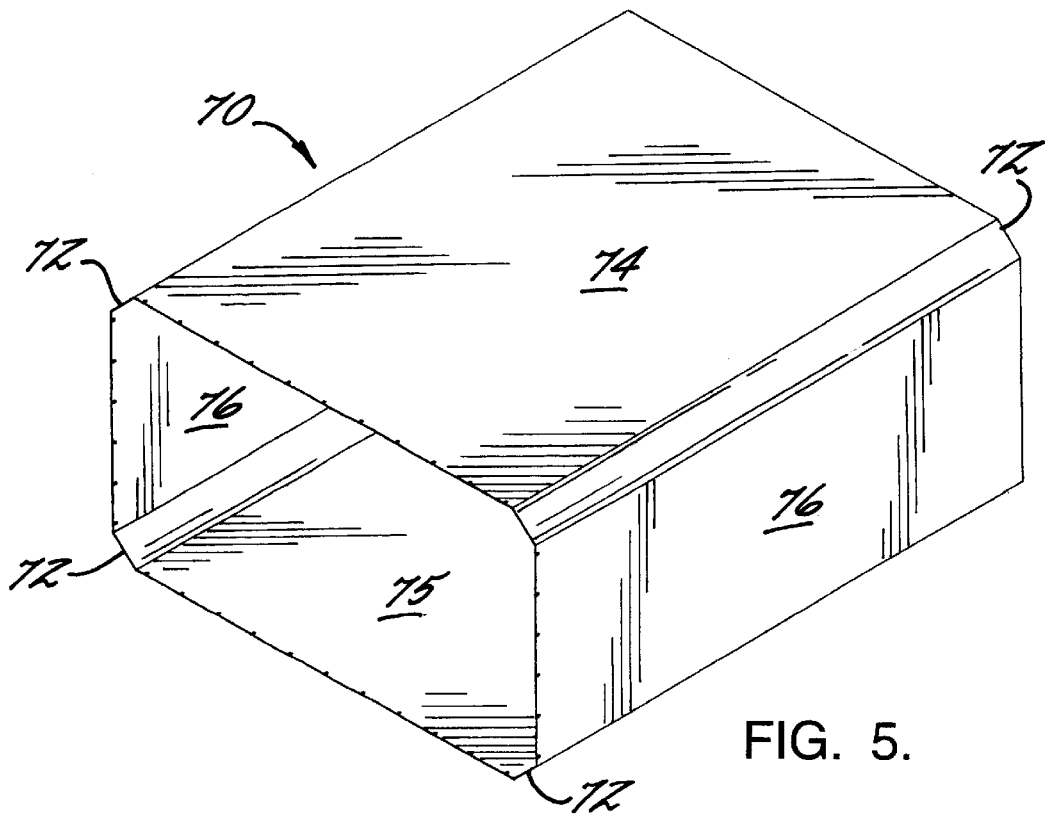
FIG. 5 is a perspective view of the outer enclosure of the passive thermal control enclosure

With reference to FIGS. 1 through 19, a first embodiment of a passive thermal control enclosure in accordance with the present invention is shown. FIG. 1 is a perspective view of the passive thermal control enclosure 40, shown with the inner door 50 and the outer door 60 removed. FIG. 2 is a front elevation of the passive thermal control enclosure 40 with the doors in place, and FIGS. 3 and 4 show two cross-sectional views through the passive thermal control enclosure 40 on vertical and horizontal planes, respectively. For convenience of explanation, various terms of direction or orientation such as "upper", "lower", "top", "bottom", "front", "rear", "vertical", "horizontal", etc., are used herein, it being understood that such terms are with reference to the orientation of the passive thermal control enclosure shown in FIG. 2, with the front of the enclosure being the end having the doors and the rear being the opposite end; however, the passive thermal control enclosure is not limited to being used in any particular orientation.

The passive thermal control enclosure 40 comprises an outer enclosure 70 (shown in isolation in FIG. 5) formed as a generally box-shaped configuration, although the longitudinally extending corners 72 that run from the front end to the rear end of the outer enclosure are formed in a chamfered fashion so as to avoid sharp corners. The outer enclosure comprises a top wall 74, a bottom wall 75 spaced from and parallel to the top wall, opposite side walls 76, and a rear wall 77 (not visible in FIG. 5, but see FIGS. 3 and 4). The walls 74, 75, 76, and 77 are preferably formed of a composite material having a high strength-to-weight ratio. Preferably, the walls comprise a carbon fiber and matrix composite material. As a representative example of suitable dimensions for the outer enclosure 70, the height measured between the outer surface of the top wall 74 to the outer surface of the bottom wall 75 can be about 9.71 inches (24.7 cm), the width between the outer surfaces of the side walls 76 can be about 17.0 inches (43.2 cm), the length of the outer enclosure from front to rear can be about 20.0 inches (50.7 cm), and the walls can have a thickness of about 0.024 inch (0.6 mm). The walls are made thin, as noted, in order to reduce the amount of heat conducted along the walls in the longitudinal (i.e., front-to-rear) direction of the enclosure. The front end of the outer enclosure 70 is open and the cross-section of the outer enclosure preferably is constant in the longitudinal direction so that the inner enclosure and insulation can be slid longitudinally into the outer enclosure as further described below.

Figure 6:
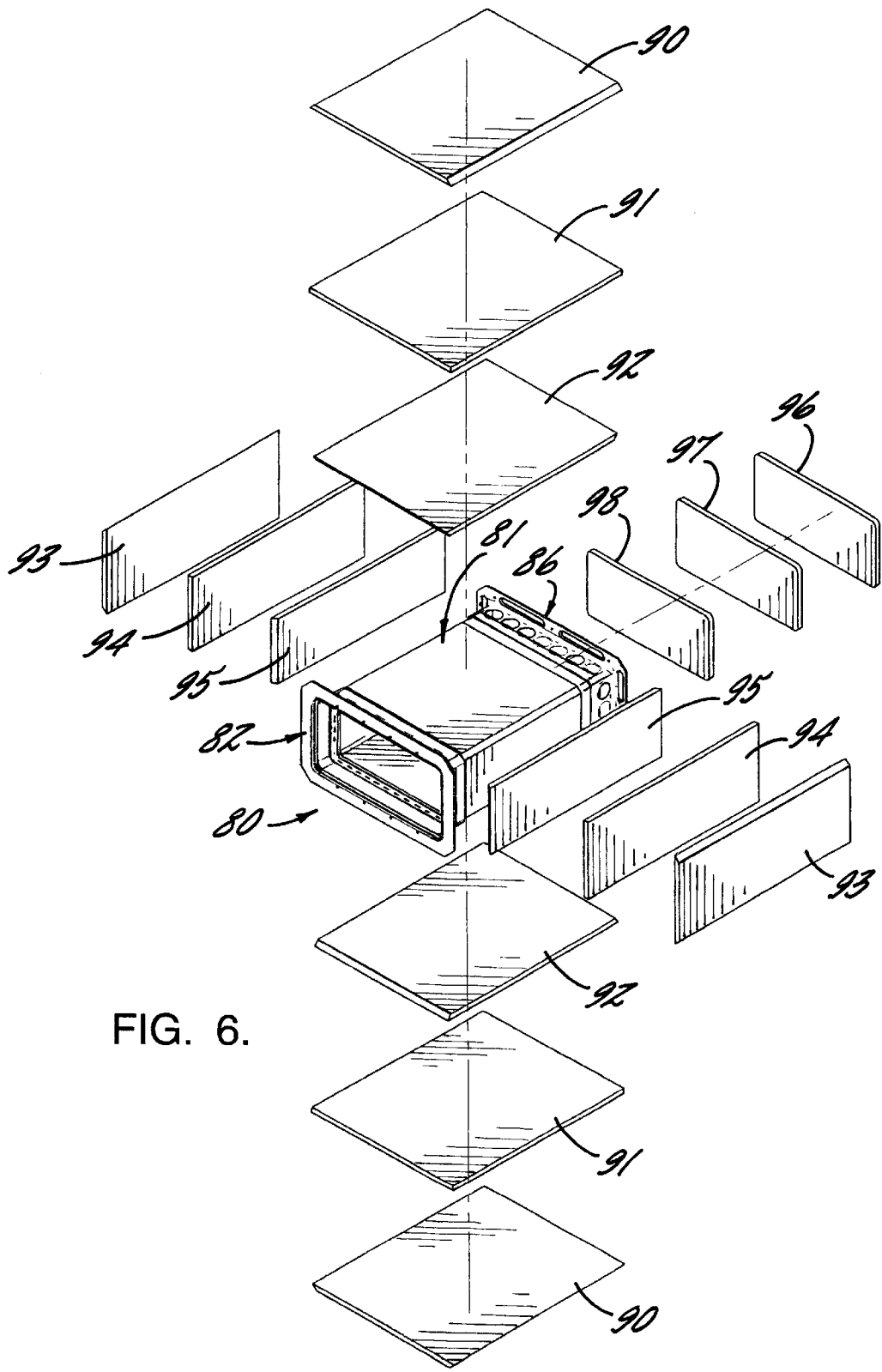
FIG. 6 is an exploded view of the components that fit inside the outer enclosure.

Contained within the outer enclosure 70 are an inner enclosure 80 and a plurality of insulators 90, 91, 92, 93, 94, 95, 96, 97, and 98 that surround the inner enclosure and fill the space between the outer and inner enclosures. FIG. 6 shows an exploded view of the inner enclosure 80 and insulators 90–98, and FIGS. 3 and 4 show the assembled passive thermal control enclosure in cross-section. The inner enclosure 80, described in further detail below, defines the interior space in which a temperature-sensitive payload is stored during transportation and storage. The top, bottom, sides, and rear of the inner enclosure 80 are surrounded by the insulators 90–98. More particularly, each of the top and bottom sides of the inner enclosure 80 is covered by a triple-thickness arrangement of insulators 90, 91, 92 disposed between the top and bottom walls 74, 75 of the outer enclosure and the top and bottom sides of the inner enclosure, as shown in FIGS. 3 and 6. Each of the other sides of the inner enclosure is covered by a triple-thickness arrangement of insulators 93, 94, 95 disposed between the side walls 76 of the outer enclosure and the corresponding sides of the inner enclosure. The rear of the inner enclosure is covered by a triple-thickness arrangement of insulators 96, 97, 98 disposed between the rear wall 77 of the outer enclosure and the rear side of the inner enclosure.

Each of the insulators 90–98 comprises a panel-shaped structure. The insulators are sized and shaped so as to collectively fill substantially the entire space between the inner and outer enclosures, as best seen in FIGS. 3 and 4. In this regard, the edges of the outermost insulators that encounter the angled or chamfered corners 72 of the outer enclosure are correspondingly angled or chamfered, as best seen in FIG. 6. Accordingly, there is very little remaining space in which thermally conductive material (e.g., air, water, etc.) can collect and thereby increase the thermal conductivity between the interior space of the inner enclosure and the surroundings outside the outer enclosure.

Each of the insulators 90–98 preferably comprises an aerogel material contained within a vacuum-sealed flexible package. Aerogel materials are well known as having extremely low thermal conductivity. Aerogel can exist in solid or powder form. As a solid, aerogel is a highly porous structure having pore sizes in the nanometer range. As a powder, aerogel has particle sizes in the nanometer range. The thermal conductivity of aerogels is substantially reduced when air is evacuated from the material. Accordingly, the insulators used in the passive thermal control enclosure of the present invention preferably comprise an aerogel powder contained in a vacuum-sealed flexible package. There are various types of aerogels including silica aerogels and organic aerogels formed of organic materials such as carbon. The preferred aerogel for use with the present invention is a carbon aerogel. The powdered aerogel is contained within a flexible bag formed of a suitable material that has substantially no gas permeability. For example, MYLAR® (a polyethylene teraphthalate material available from E.I. du Pont de Nemours & Company) is a suitable material for containing the aerogel. The bag is evacuated and sealed so that very little air remains in the bag. The result is an insulator that is highly effective, and is also light in weight because of the large void fraction inherent in aerogel materials.

An important feature of the present invention is the provision of redundancy in the insulators 90–98. That is, each side of the inner enclosure 80 is insulated by more than one insulator stacked together, rather than using a single insulator having the same overall thickness. Although such a single insulator could be used, it would be undesirable to do so with the vacuum-sealed aerogel insulators employed in the present invention, because if the single insulator developed a leak in the sealed bag, the insulating capacity would be seriously impaired. Accordingly, the present invention employs multiple stacked insulators so that if one insulator should be breached, there is at least one other insulator that still retains its full insulating capability.

Turning now to FIGS. 7 through 11, the construction of the inner enclosure 80 is described. The inner enclosure 80 comprises a main portion 81 formed as a generally box-shaped structure that is generally geometrically similar to the outer enclosure 70 but smaller in dimensions so that the main portion 81 can fit inside the outer enclosure with space therebetween on all sides to accommodate the insulators as previously described. The inner enclosure 80 also includes a front support 82 and a rear support 86 that provide increased structural rigidity to the inner enclosure and also perform other functions as noted below.

The main portion 81 of the inner enclosure preferably comprises a material having high strength-to-weight ratio and also having a low thermal conductivity particularly in the thickness direction through the walls of the main portion. Preferably, the main portion 81 includes a fiber and matrix composite material for high strength, and a thermal insulation material. More particularly, in the preferred embodiment the walls of the main portion 81 are formed of a sandwich or laminate construction having a core of thermally insulating material, and fiber matrix composite skins bonded to the opposite faces of the core. The skins advantageously comprise a carbon fiber and matrix composite material. The core advantageously comprises a honeycomb material such as NOMEX HRH-10, which is a non-metallic NOMEX®/phenolic honeycomb available from Hexcel Corporation. NOMEX® is a registered trademark of E.I. du Pont de Nemours & Company, and refers to a nonwoven fabric constructed of aramid fibers.

The front support 82 is shown in isolation in FIG. 1. The front support comprises a generally rectangular tubular structure having an integral front lip 83 formed as a flange that extends radially outwardly from the tubular portion 84 of the front support and is normal to the longitudinal axis of the tubular portion. The tubular portion 84 of the front support is sized so that it fits closely around the front end of the main portion 81 of the inner enclosure, and the tubular portion 84 is permanently fastened to the main portion 81 by a suitable adhesive or by any other appropriate fastening technique. The tubular portion 84 of the front support advantageously includes recesses 85 that extend partially through the thickness thereof in order to reduce the weight of the front support. The front support 82 preferably is formed of a composite material for high strength-to-weight ratio. A suitable material is laminated fiberglass composite material.

The front lip 83 of the front support provides structural rigidity to the front support, and also covers the front edges of the insulators 90–95 so as to protect them from contact with other objects that could puncture or tear the flexible bags of the insulators. The front lip 83 also defines a recess in which a portion of the outer door seats when closed, as further described below.

The rear support 86 of the inner enclosure is generally similar in configuration to the front support, and includes a tubular portion 87 and a rear lip 88. The tubular portion 87 fits closely about the rear end of the main portion 81 of the inner enclosure and is permanently fastened thereto by adhesive bonding or other technique. The rear lip 88 provides structural rigidity to the rear support and also covers the rear ends of the insulators 90–95 to protect them. The rear insulators 96–98 are contained within the tubular portion 87 of the rear support, as best seen in FIGS. 3 and 4. The tubular portion 87 and the rear lip 88 each includes holes 89 for reducing the weight of the rear support. The rear support advantageously is made of a material similar or identical to that of the front support.

Figure 7:
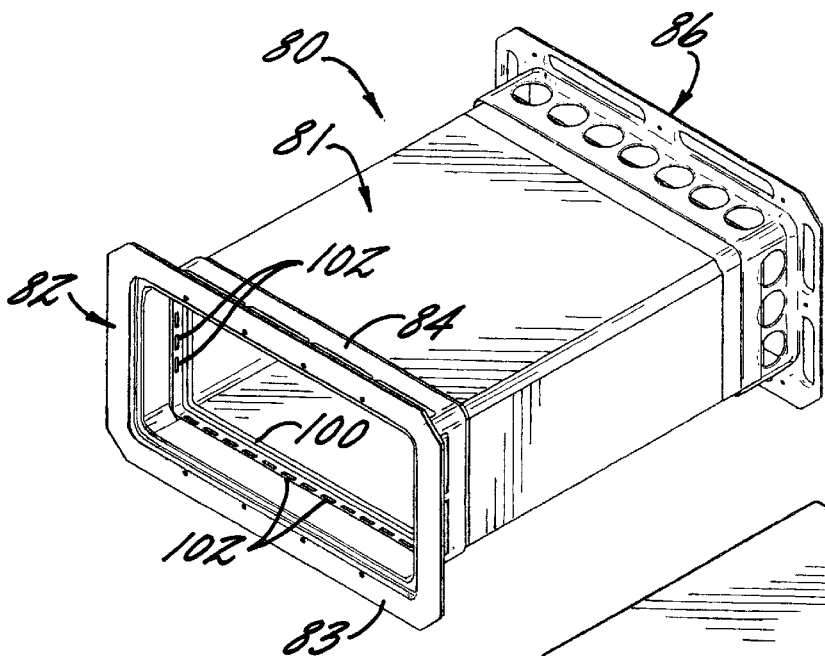
FIG. 7 is a perspective view of the inner enclosure of the passive thermal control enclosure.
Figure 8:
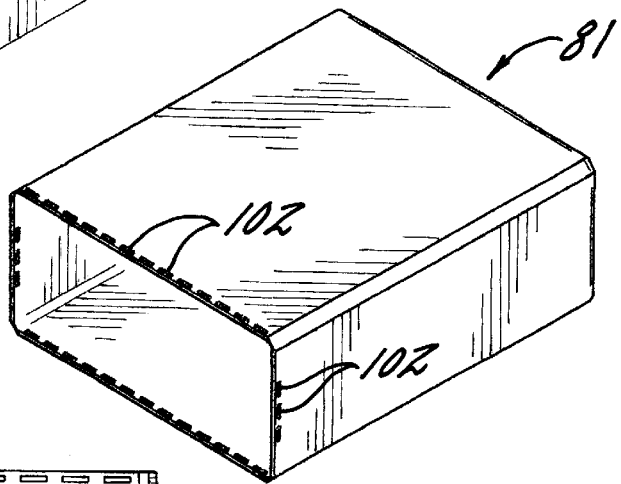
FIG. 8 is a perspective view of a portion of the inner enclosure.
Figure 9:
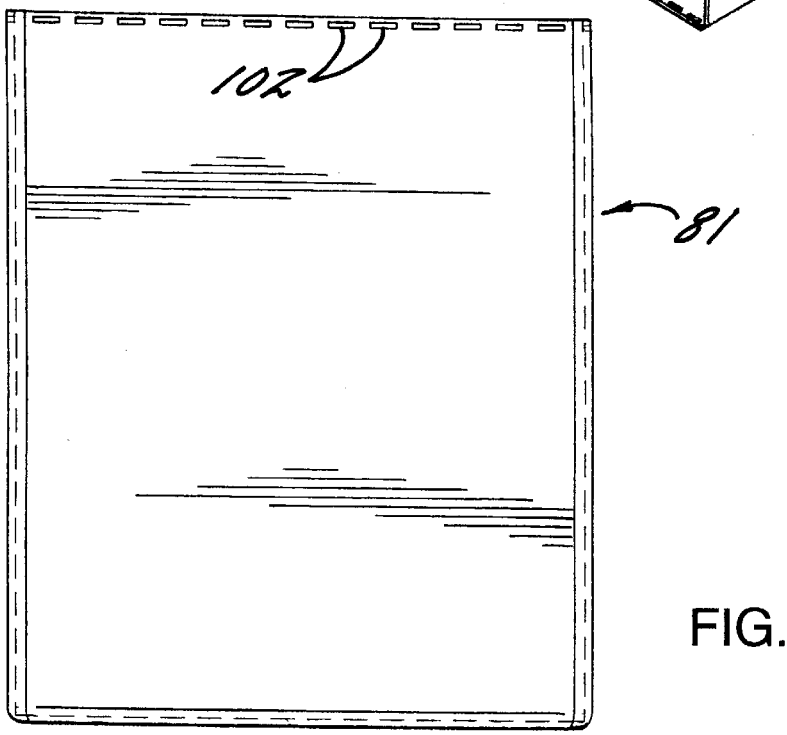
FIG. 9 is a top elevation of the portion of the inner enclosure shown in FIG. 8.
Figure 13:
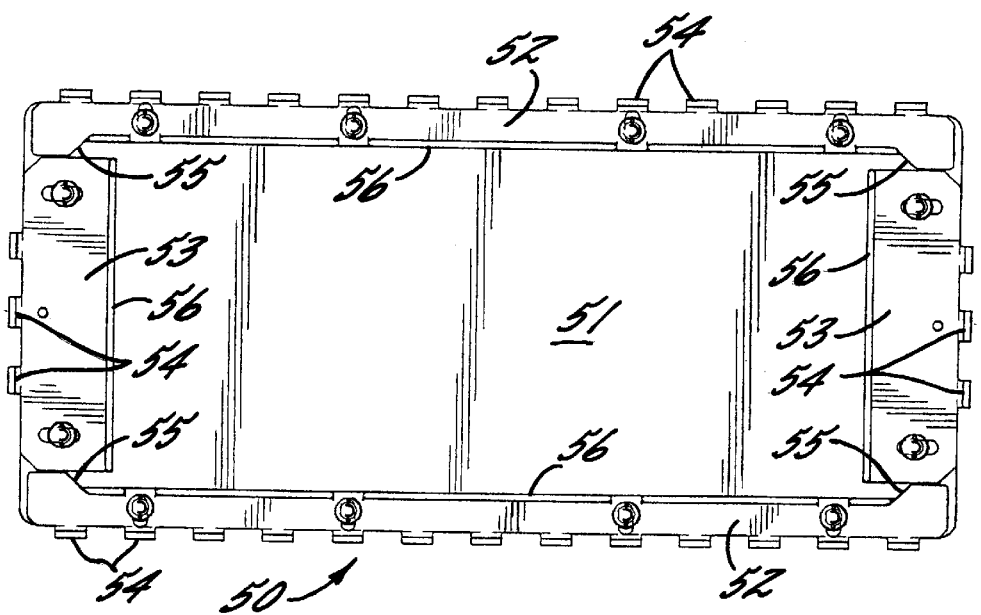
FIG. 13 is a plan view of the inner door.
Figure 14:
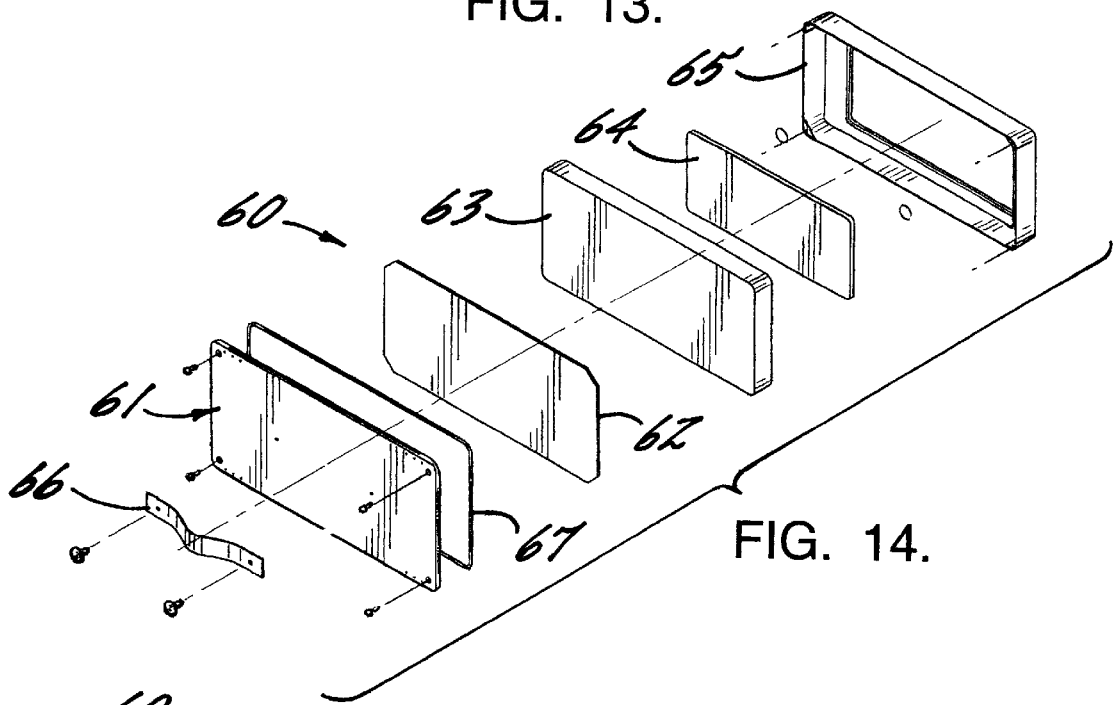
FIG. 14 is an exploded view of the outer door of the passive thermal control enclosure.
Figure 15:
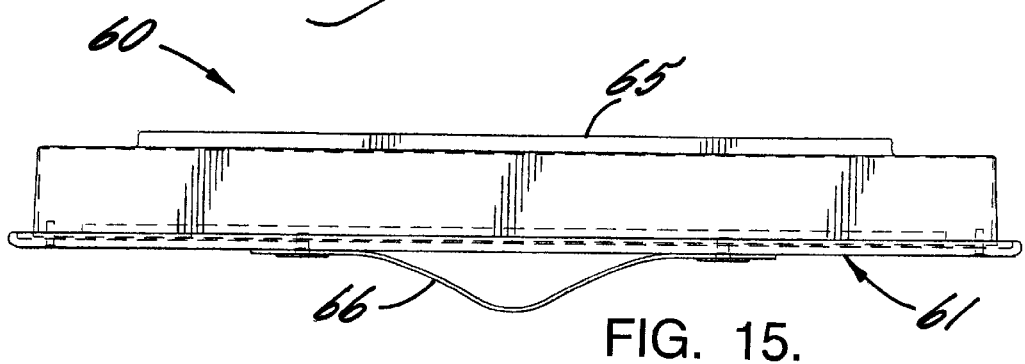
FIG. 15 is a top elevation of the outer door.

Turning next to FIGS. 12 through 17, the inner and outer doors of the passive thermal control enclosure are described. The inner door 50 is illustrated in FIGS. 12 and 13, and comprises a support plate 51 of generally rectangular plan shape sized and shaped to fit closely within the front end of the main portion 81 of the inner enclosure. As seen in FIGS. 3, 4, and 7, the main portion 81 of the inner enclosure includes an inner door stop 100 that is integrally formed on, or more preferably is separately formed and then bonded to, the inner surface of the main portion 81 to provide a stop surface against which the rear-facing surface of the support plate 51 of the inner door seats when the inner door is inserted into the front end of the inner enclosure. Just forward of the inner door stop 100 are a series of holes or recesses 102 formed in each of the four walls of the inner enclosure. The inner door 50 includes latch members that engage these holes 102 so as to latch the inner door closed.

More specifically, the inner door includes top and bottom latch members 52 that are mounted against the front-facing surface of the support plate 51 adjacent the top and bottom edges, respectively, of the support plate, and opposite side latch members 53 that are mounted against the front-facing surface of the support plate adjacent the opposite side edges thereof. The latch members 52 and 53 are slidable relative to the support plate 51. In particular, the top and bottom latch members 52 are slidable upward and downward, toward and away from each other, and the side latch members 53 are slidable laterally outward and inward, toward and away from each other. The latch members are made slidable by attaching them to the support plate by shoulder bolts extending through elongated holes formed in the latch members and into the support plate. Each of the latch members defines a series of projections or fingers 54 that extend outwardly from the respective edge of the support plate. The latch members and their fingers 54 are arranged such that when the latch members are slid outwardly the fingers 54 project beyond the edges of the support plate so that they can engage the holes 102 in the inner enclosure; conversely, when the latch members are slid inwardly the fingers 54 will disengage the holes 102 and thus allow the inner door to be removed from the inner enclosure. The fingers 54 preferably have chamfered or inclined surfaces that facilitate initial engagement of the fingers into the holes 102 and also act as ramps or cams as the latch members are slid further outward such that a force is exerted on the latch members, and hence on the inner door, in the longitudinal rearward direction. In this manner, the inner door is urged against the door stop 100. A seal (not shown) can be provided between the inner door and the door stop, if desired, and the ramp or cam action of the latch fingers 54 can facilitate compression of the seal.

Preferably, as shown best in FIG. 13, the side latch members 53 act as cams against the top and bottom latch members 52 such that when the side latch members are slid outwardly away from each other they ride along inclined surfaces 55 of the top and bottom latch members 52 and thus force the top and bottom latch members outwardly away from each other. In this manner, the four latch members can be moved into their latched positions engaging the holes 102 in the inner enclosure by grasping only the two side latch members 53 and moving them outwardly. When it is desired to remove the inner door, the latch members are moved to their unlatched positions by first sliding the side latch members 53 inward to disengage the holes 102 in the side walls of the inner enclosure and so that the side latch members clear the top and bottom latch members 52, and then sliding the top and bottom latch members inwardly to disengage the holes 102 in the top and bottom walls of the inner enclosure. To facilitate grasping and sliding the latch members, each of the latch members includes a lip or projection 56 that extends generally perpendicular to the main surface of the latch member.

The latching arrangement of the inner door 50 is beneficial particularly when the thermal control enclosure is used in microgravity such as on an orbiting space station. In microgravity, any net reaction force on the operator of the latches would cause the operator to be propelled in the direction of the reaction force unless the operator were restrained such as with footholds or the like. The use of such restraints, although effective, is cumbersome and hence it would be desirable to eliminate dependence on them. The latching arrangement of the inner door 50 makes this possible. In this regard, the latch members 52, 53 can be slid between their latched and unlatched positions by applying equal and opposite force pairs. More particularly, the latch members 52, 53 can be actuated in one of two ways. One way is to simultaneously exert equal and opposite forces on the two latch members of each pair to slide them toward or away from each other, thus producing no net reaction force on the person operating them. Another way to actuate the latch members is to slide them one at a time by using the fingers and thumb of one hand and using the structure surrounding the inner door to react the force exerted on the latch member, thereby again producing no net reaction force on the operator.

Turning now to FIGS. 14 through 19, the outer door 60 and the latching thereof are described. The outer door 60 comprises a front support plate 61, a plurality of insulators 62, 63, 64, and a rear insulator cover 65 that attaches to the front support plate 61 and captures the insulators therebetween. The insulators 62–64 are generally similar in construction to the insulators 90–98 previously described, and hence are not further described herein. The outer door also includes a handle 66 attached to the front side of the front support plate 61, and an O-ring seal 67 whose function is described below.

Figure 16:
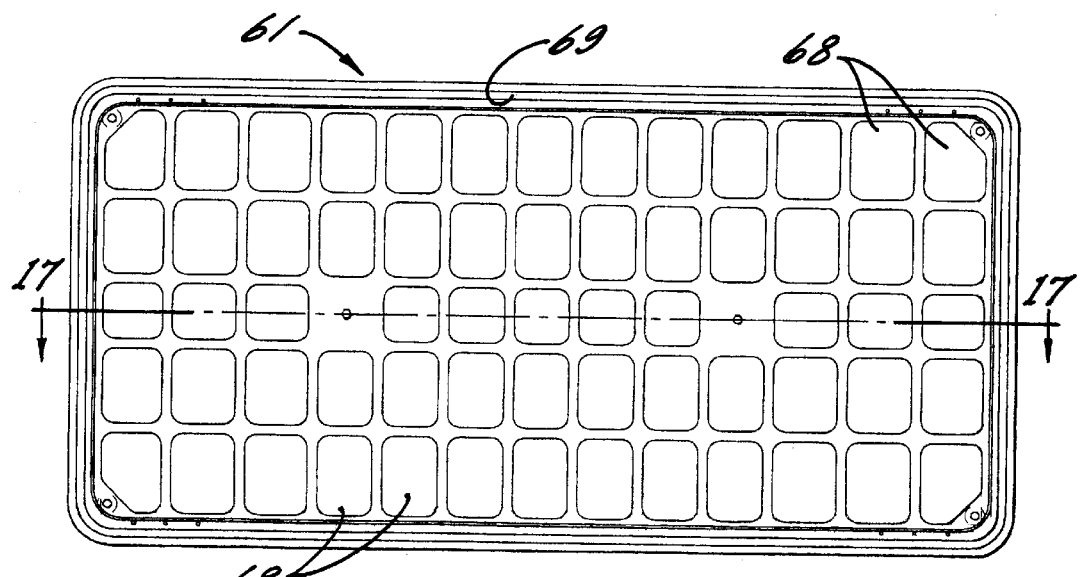
FIG. 16 is a plan view of the rear side of the front support plate portion of the outer door.
Figure 17:
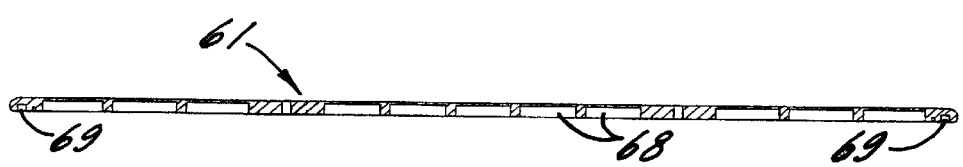
FIG. 17 is a cross-sectional view taken along line 17—17 of FIG. 16.
Figure 19:
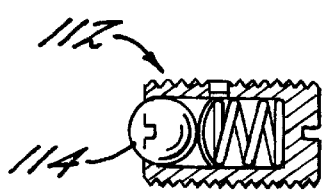
FIG. 19 is a still further enlarged view of one of the ball spring plungers.

The front support plate 61 is shown in greater detail in FIG. 16, which is a plan view of the rear side of the plate. The front support plate 61 includes recesses 68 that extend partially through the thickness of the plate in order to reduce the weight of the plate. Generally rectangular recesses are shown, creating a rectangular grid of full-thickness material between the recesses. However, alternatively the plate could have generally triangular recesses (not shown) arranged such that the full-thickness areas between the recesses create an isogrid arrangement. Such isogrid arrangements are advantageous in terms of rigidity because they resist torsional deformations better than do rectangular grids.

The rear side of the front support plate 61 also defines a groove 69 that extends all the way around the perimeter of the plate for retaining the O-ring seal 67. The O-ring seal 67 is held in a portion of the plate 61 that extends outward beyond the rear insulator cover 65 of the outer door. Accordingly, when the outer door is inserted into the front opening of the inner enclosure, this outwardly extending portion of the plate 61 confronts a surface of the front support 82 of the inner enclosure, as best seen in FIG. 4, and the O-ring seal 67 is compressed between these two confronting surfaces.

Figure 18:
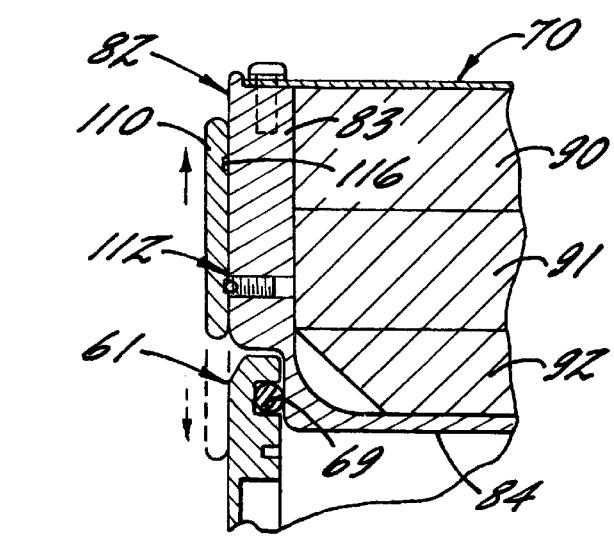
FIG. 18 is a greatly enlarged view of the portion of FIG. 3 contained in the dotted-line circle, showing details of the ball spring plungers used for fixing the latch bars for the outer door in the latched position.

The compression of the O-ring seal 67 is facilitated by the latching arrangement for the outer door 60, which is now described with reference to FIGS. 1–4, 18, and 19. The latching arrangement for the outer door includes top and bottom latch members 110 slidably mounted to the front side of the front lip 83 of the inner enclosure's front support. The latch members 110 slide upward and downward, toward and away from each other. FIG. 18 shows a greatly enlarged view of the upper latch member 110 slid upwardly to its unlatched position so that it clears the outer edge of the outer door's support plate 61. When the latch member 110 is slid downward to its limit of movement, the lower portion of the latch member 110 extends below the outer edge of the support plate 61. The other latch functions in a similar fashion. By appropriately sizing the various components, a slight interference fit can be provided such that the outer door must be pressed slightly to the right in FIG. 19 and thereby compress the O-ring seal 67 in order to slide the latches to their latched positions. The sliding of the latches can provide the force for pressing the outer door in this manner. The latching arrangement thus ensures a reliable seal between the outer door and the inner enclosure. The latches can be held in the latched positions by a plurality of ball spring plungers 112 installed in the front lip 83 of the inner enclosure's front support. The balls 114 of the plungers 112 engage detents 116 formed in the latch members 110 when the latch members are slid to the latched positions, so that it requires a certain level of force in order to move the latch members to the unlatched positions.

Figure 23:
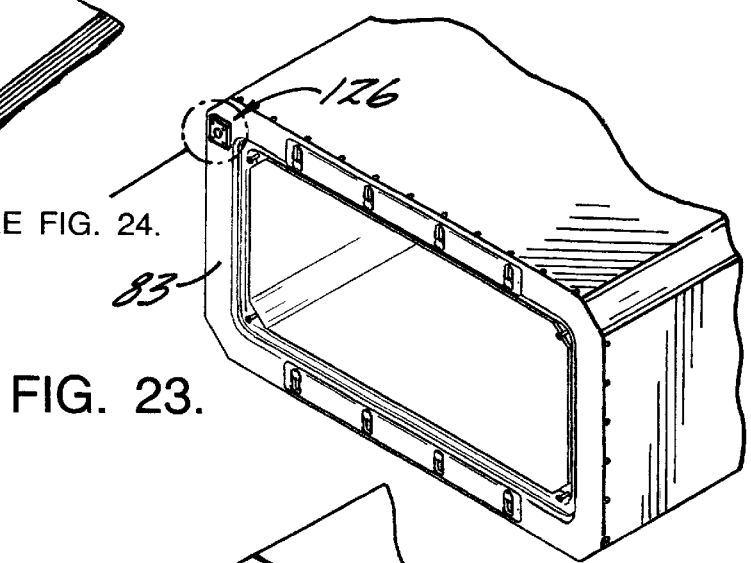
FIG. 23 is a perspective view of a front portion of a passive thermal control enclosure in accordance with another embodiment of the invention, including at least one pressure equalization vent.
Figure 24:
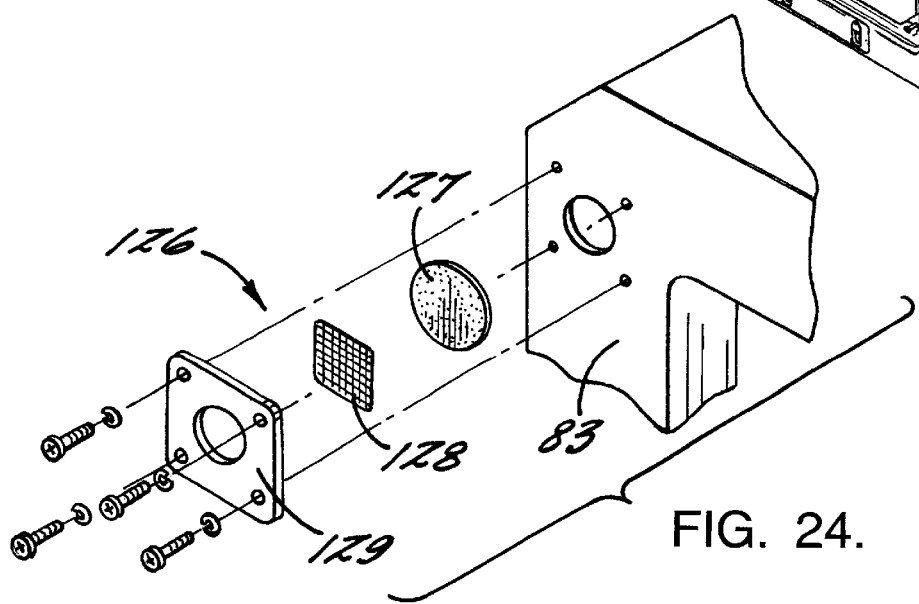
FIG. 24 is an exploded view of the pressure equalization vent.

The passive thermal control enclosure of the present invention is shown in an alternative embodiment in FIG. 23, which is substantially similar to that previously described except that the enclosure includes at least one, and preferably several, pressure equalization vents 126 that vent the space between the inner and outer enclosures to prevent a large pressure differential across the walls of the enclosures. The vent is shown in exploded detail view in FIG. 24. The vent comprises a hole formed through the front lip 83 of the inner enclosure into the space between the enclosures, a filter 127 of a material that is permeable to gases but impermeable to liquid (e.g., GORETEX®) that covers the hole, a support screen 128 that provides additional rigidity to the filter 127, and a cover plate 129 that is fastened to the front lip 83 to hold the support screen and filter in place covering the hole.

The passive thermal control enclosure of the present invention is designed to maintain a payload contained in the inner enclosure 80 at a predetermined temperature for a prolonged period of time with the aid of phase change material that changes from one phase to another (e.g., solid to liquid). As well known, during a change of phase when there are two phases present simultaneously, many materials remain at an essentially constant temperature until all of the material has changed to a single phase. The thermal control enclosure of the present invention reduces heat transfer between the phase change material and the surrounding environment so as to prolong the two-phase condition as long as possible.

Figure 22:
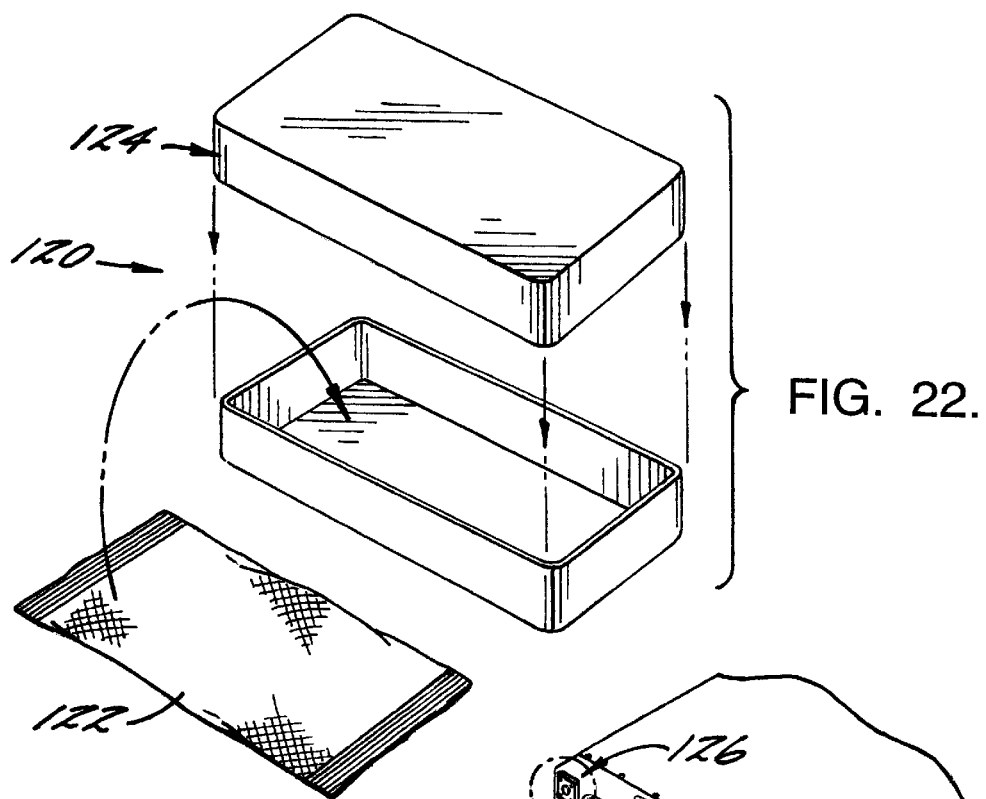
FIG. 22 is an exploded view of a pack of phase change material in accordance with one preferred embodiment of the invention.

To this end, the thermal control enclosure of the invention employs sealed packs of phase change material that are placed within the inner enclosure 80 along with the payload that is to be maintained at a controlled temperature. A preferred construction for the packs of phase change material is depicted in FIG. 22. A pack 120 of phase change material is formed by filling a flexible first package 122 with a quantity of phase change material and sealing the package. The first package 122 preferably is then placed in a second package and sealed so that there are two independent levels of containment for the phase change material. The second package can comprise a box 124 formed in two halves that fit together and are sealed together. The flexible first package 120 can be formed of various materials; one suitable example is TEFLON®. The box 124 can be formed of various materials, such as polycarbonate, polysulfone, ECTFE (Halar), or TEFLON®, and preferably is vacuum thermo-formed to have very thin walls in order to facilitate heat transfer to and from the phase change material.

Various types of phase change materials can be used, partly dependent on the temperature at which the payload is to be maintained. More particularly, different phase change materials have different phase transition temperatures. Among the phase change materials that can be used with the present invention are water, heavy water (deuterium oxide), various paraffins including n-heptadecane or n-eicosane or others, and TEA-16 (a blend of $CaCl_2$, NaCl, and KF). When the thermal control enclosure is used in a spacecraft environment such as on the International Space Station (ISS), there are considerations of toxicity, outgassing, reactivity, and others, that can make certain phase change materials more attractive than others. Additionally, a suitable phase change material should have a high heat of fusion and a high density. Taking these various considerations into account, an ideal phase change material is water, since it is non-toxic, does not outgas, is relatively non-reactive, and has the highest heat of fusion of the materials specifically listed above. Thus, where the payload is to be maintained at substantially 0° C., water is an ideal phase change material.

If the payload is to be maintained at other than 0° C., then other phase change materials can be used. For instance, many biological samples and specimens may be damaged if frozen and hence it may be desirable to maintain them just above freezing, such as at 4° C. Heavy water has a phase transition temperature of 3.8° C., and thus can be used for maintaining such a payload at the suitable temperature.

Figure 20:
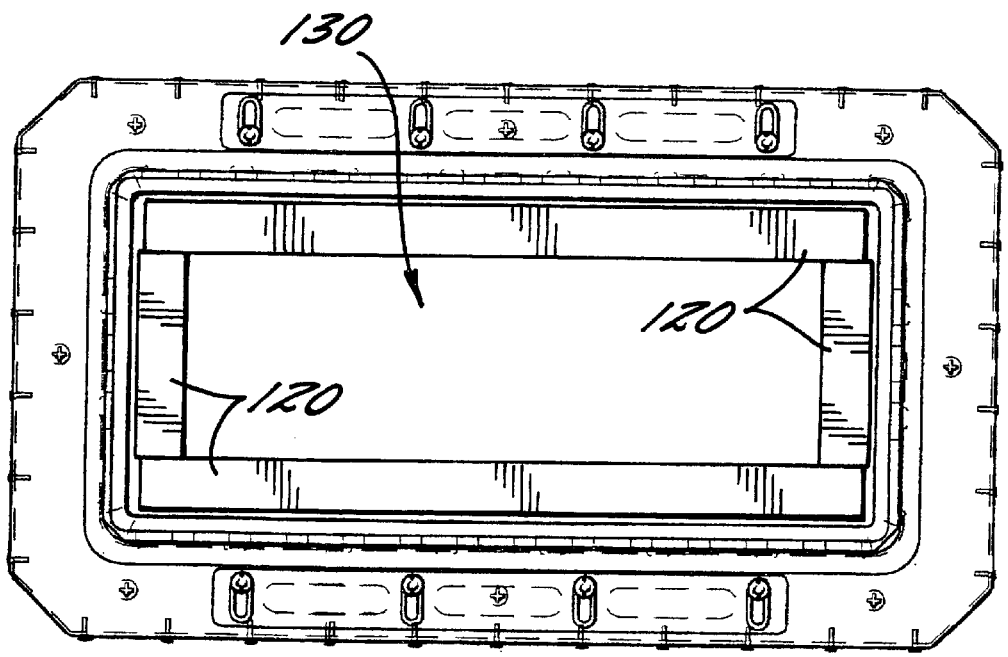
FIG. 20 is a front elevation of the passive thermal control enclosure, showing packs of phase change material loaded into the enclosure in one configuration.

The packs 120 of phase change material can be loaded into the thermal control enclosure in various configurations depending on the size of the payload and the temperature to be maintained. FIG. 20 shows one exemplary arrangement suitable for use with water as the phase change material when the payload is to be maintained at 0° C. A plurality of packs 120 of phase change material are arranged such that they fit together with each other and create a self-supporting structure that lines the inner walls of the enclosure and creates an interior space 130 in which the payload can be stored. This arrangement could also be used to keep a payload at 4° C. if the packs 120 contained a suitable phase change material having a phase transition temperature at about 4° C., such as heavy water.

Figure 21:
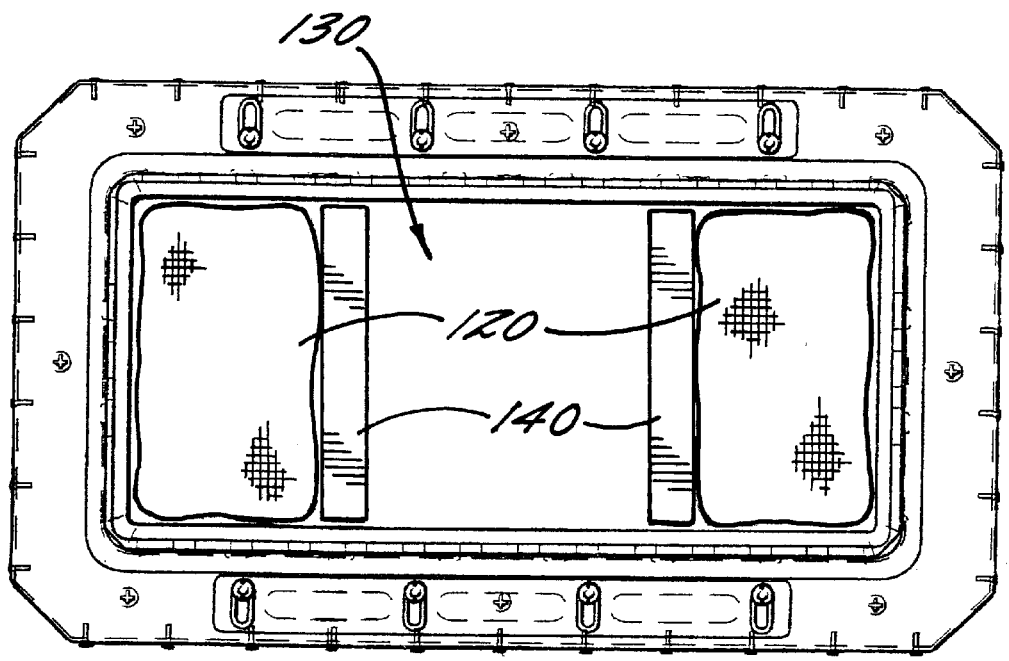
FIG. 21 is a view similar to FIG. 20, showing one possible alternative configuration of the packs of phase change material and including insulation between the packs of phase change material and the space where a payload is stored.

Alternatively, a payload could be kept at 4° C. using water as the phase change material by using the arrangement shown in FIG. 21, in which thermal insulation 140 is disposed between the packs 120 of phase change material and the payload contained in the space 130.

Figure 27:
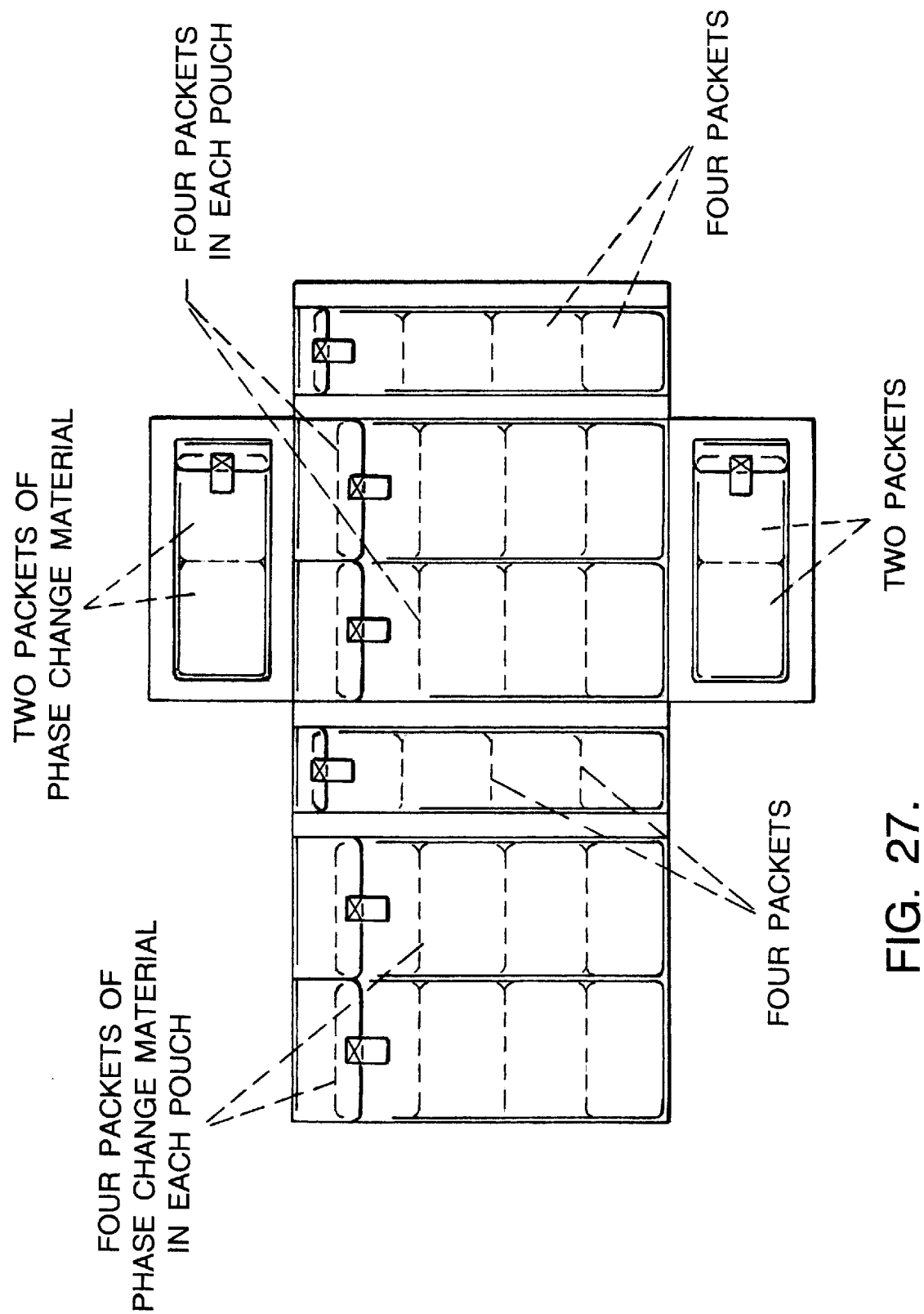
FIG. 27 shows a flexible webbing with pockets for containing packs of phase change material.

Many other arrangements of the packs of phase change material can also be used. The invention is not limited to any particular arrangement. In some instances, it may be advantageous to contain the packs of phase change material in a flexible webbing or the like that has pockets arranged for receiving the packs. The pockets and the webbing can be arranged such that it is possible to fold the webbing with the packs of phase change material contained therein, so as to form a box-like or cube-like structure that is substantially self-supporting and fits closely within the enclosure. Such a webbing and method are illustrated in FIGS. 27 and 28.

Figure 25:
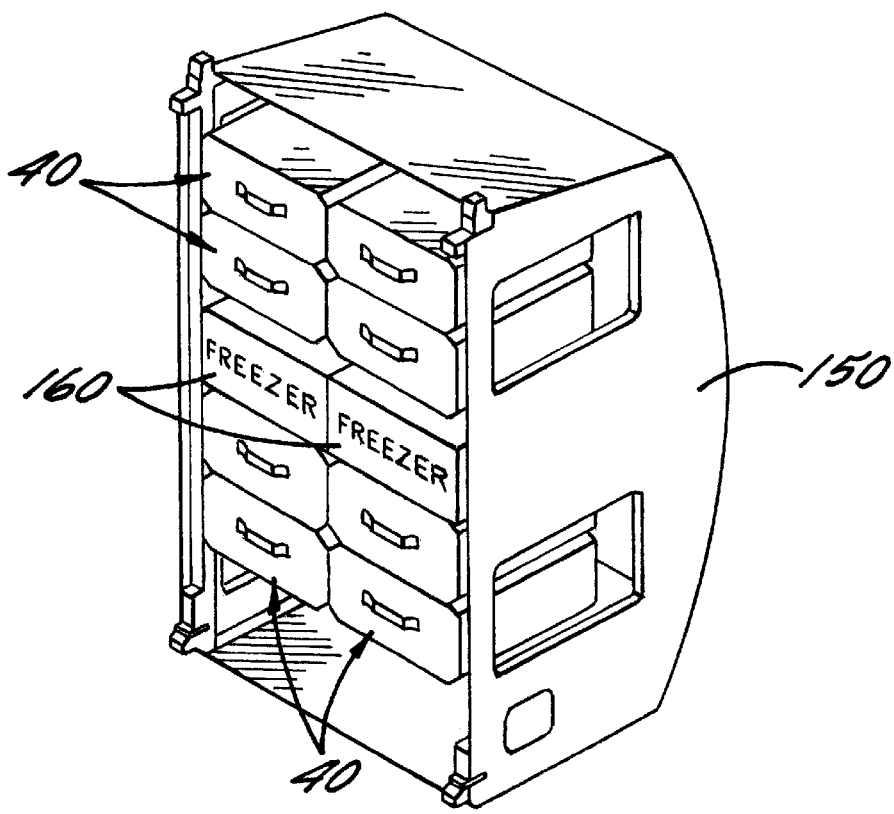
FIG. 25 is a perspective view of a storage rack containing several of the passive thermal control enclosures and a pair of freezers for re-freezing the packs of phase change material.

The thermal control enclosure, when used aboard a spacecraft such as the Space Shuttle or the International Space Station, preferably is configured to fit within a standard rack used on such spacecraft. As an example, as depicted in FIG. 25, one or more of the thermal control enclosures 40 can be contained in a rack 150. If desired, the rack can also contain other equipment such as freezers 160 for re-freezing packs of phase change material after they have been spent.

The present invention encompasses a method of transporting and storing temperature-sensitive payloads to an orbiting spacecraft such as the ISS, using the thermal control enclosure. Testing of prototypes of the present invention has demonstrated that the thermal control enclosure can maintain a payload at 0° C. for 10 days when the ambient temperature is 30° C., and for 15 days when the ambient temperature is 20° C., which are representative temperatures that can be expected aboard the ISS in the various locations in which the thermal control enclosure might be stored. In order to keep a payload at 0° C. for longer periods of time, it would be necessary to periodically replace spent phase change material with fresh (i.e., frozen) packs of phase change material. Various options are possible for providing such fresh packs of phase change material.

One option is to re-freeze the packs onboard the ISS. Investigation of this method by the inventors has revealed that freezing water in microgravity entails certain unique considerations that do not come into play when freezing water on earth. One such consideration is the fact that convection of the water does not occur, which can lead to undesirable results. For instance, the possibility of the water becoming supercooled (i.e., cooled to below 0° C. yet remaining in liquid form) is increased in microgravity. If such were to occur during the re-freezing process, and the water were to become supercooled substantially below 0°

C., it can occur that the water may suddenly and unpredictably freeze, such as when subjected to a vibration. Such rapid freezing could fracture the packaging in which the water is contained.

To prevent this from occurring, preferably the water also contains a nucleating agent to provide nucleation sites for ice to form around, thereby preventing supercooling. Various types of nucleating agents are known in the art, and hence are not further described herein.

Figure 26:
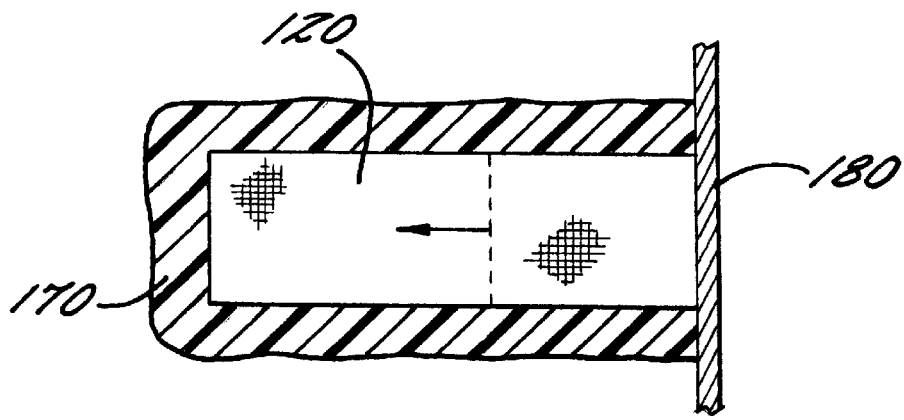
FIG. 26 is a diagrammatic view illustrating a method of freezing a pack of phase change material in accordance with the present invention.

The invention also encompasses a method of re-freezing packs of phase change material to reduce the possibility of rupture as a result of expansion of the material. Water and heavy water, unlike most phase change materials, expand upon freezing. If the expansion occurs in an uncontrolled manner, localized areas of a pack of water can expand so much that the pack can rupture. FIG. 26 diagrammatically depicts a method of freezing that aims to control the freezing process and the resultant expansion. In accordance with this method, all sides of the pack 120 of phase change material except for one are insulated with suitable insulation 170. The remaining side is exposed to a suitable source of cold temperature 180, which can be a powered refrigerator, a radiator radiating into the heat sink of space, or the like. The result is that the phase change material begins freezing adjacent the cold source 180 and proceeds in a direction away therefrom toward the opposite end of the pack. The one-dimensional freeze front helps ensure that the expansion of the phase change material occurs substantially uniformly.

In accordance with the invention, particularly when water and heavy water are used as the phase change material, it is preferred to degas the material prior to sealing it in the packs. Water that contains air tends to expand to a substantially greater extent than does degassed water. Hence, by degassing the phase change material, the degree of expansion during freezing can be minimized.

Another option for increasing the duration of the phase change thermal control is to place the thermal control enclosure in a region that can be maintained at a temperature lower than that of the normal surroundings. For example, the ISS has a low-temperature coolant loop that can be provided to so-called "cold plates". The thermal control enclosure of the present invention can be placed adjacent to such a cold plate.

Still another option for providing fresh packs of phase change material is to transport them to the orbiting ISS aboard the Space Shuttle. The fresh packs can be transported in the thermal control enclosure of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A passive thermal control enclosure comprising:
   an inner enclosure having a plurality of walls joined together to form a generally box-shaped configuration, the inner enclosure having an opening at one end thereof, the walls of the inner enclosure comprising a rigid structural material and at least some of the walls also including a thermally insulating material;
   an outer enclosure having a plurality of walls joined together to form a generally box-shaped configuration surrounding the inner enclosure such that there is a space between each wall of the inner enclosure and a corresponding wall of the outer enclosure, the outer enclosure having an opening at one end thereof in registration with the opening in the inner enclosure for inserting items into and removing items from the inner enclosure;
   an inner door releasably engaged with the inner enclosure for closing the opening therein, and an outer door releasably engaged with the outer enclosure for closing the opening therein;
   a thermally insulating body disposed in the space between each wall of the inner enclosure and the corresponding wall of the outer enclosure, each thermally insulating body comprising a plurality of insulators stacked together to provide redundancy such that if one insulator loses its insulating ability there is at least one other insulator for insulating the corresponding wall of the inner enclosure; and
   at least one sealed pack of phase change material disposed inside the inner enclosure.

2. The passive thermal control enclosure of claim 1, wherein the insulators between the inner and outer enclosures each comprises a vacuum-sealed flexible package filled with an insulating material.

3. The passive thermal control enclosure of claim 2, wherein the insulating material in the insulators comprises an aerogel.

4. The passive thermal control enclosure of claim 3, wherein the aerogel comprises a carbon and silica aerogel.

5. The passive thermal control enclosure of claim 1, wherein the inner enclosure and outer enclosure each has a top wall and a bottom wall parallel to and spaced from each other, opposite side walls, and a rear wall.

6. The passive thermal control enclosure of claim 5, wherein the walls of the inner enclosure comprise fiber-matrix composite material.

7. The passive thermal control enclosure of claim 6, wherein the top, bottom, and side walls of the inner enclosure each comprises a sandwich structure having fiber-matrix composite skins between which a core of thermally insulating material is disposed.

8. The passive thermal control enclosure of claim 7, wherein the core of thermally insulating material comprises a honeycomb material.

9. The passive thermal control enclosure of claim 5, wherein the inner enclosure includes a latch assembly for latching the inner door closed.

10. The passive thermal control enclosure of claim 9, wherein the latch assembly comprises a pair of sliding latches that slide in opposite directions from each other for latching the inner door.

11. The passive thermal control enclosure of claim 1, wherein the outer enclosure includes a pressure equalization vent allowing gases to pass into and out from the space between the inner and outer enclosures.

12. The passive thermal control enclosure of claim 11, wherein the pressure equalization vent prevents liquids from passing therethrough.

13. The passive thermal control enclosure of claim 1, wherein the at least one pack of phase change material comprises a quantity of phase change material contained within a sealed first package, and a sealed second package that contains the first package.

14. The passive thermal control enclosure of claim 13, wherein there are a plurality of packs of phase change material configured to interface with the inner enclosure and with one another such that the packs of phase change material create a self-supporting structure defining an interior space therein for containing items to be temperature-controlled.

15. The passive thermal control enclosure of claim 14, further comprising a layer of thermal insulation disposed inside the interior space created by the packs of phase change material for surrounding items so as to regulate the items to a temperature higher than a phase transition temperature for the phase change material.

16. The passive thermal control enclosure of claim 1, wherein the phase change material comprises water to which a nucleating agent is added to prevent supercooling of the water during a freezing cycle.

17. The passive thermal control enclosure of claim 1, further comprising a plurality of packs of a first phase change material, and a plurality of packs of a second phase change material, the first and second phase change materials having different predetermined phase transition temperatures, whereby different temperatures can be maintained in the passive thermal control enclosure by appropriate selection of phase change materials.

18. The passive thermal control enclosure of claim 1, further comprising an elastic seal for sealing between the outer door and the outer enclosure.

19. A passive thermal control enclosure for use in microgravity, comprising:
   an inner enclosure of generally box-shaped configuration having an opening at one end thereof;
   an outer enclosure of generally box-shaped configuration having an opening at one end thereof, the inner enclosure being disposed inside the outer enclosure such that the openings of the two enclosures are in registration with each other;
   thermal insulators disposed between the inner and outer enclosures;
   an inner door releasably engageable with the inner enclosure for closing the opening thereof, and an outer door releasably engageable with the outer enclosure for closing the opening thereof; and
   latches for at least one of the inner and outer doors, the latches being configured such that the latches are movable between latched and unlatched positions by application of force pairs exerted in opposite directions such that substantially no net reaction force is exerted on the person applying the force pairs.

20. The passive thermal control enclosure of claim 19, wherein the latches comprise a pair of first latch members slidably mounted on the inner door and slidable toward and away from each other, the first latch members having projections that engage corresponding receptacles in structure that surrounds the inner door when the inner door is positioned to close the opening in the inner enclosure and the first latch members are slid away from each other.

21. The passive thermal control enclosure of claim 20, wherein the inner door is generally rectangular having four edges, and wherein the first latch members are mounted adjacent each of two of the edges that are opposite from each other.

22. The passive thermal control enclosure of claim 21, further comprising a pair of second latches having projections that engage receptacles in the structure surrounding the inner door, the second latches being mounted to slide in directions perpendicular to that in which the first latches slide.

23. The passive thermal control enclosure of claim 20, wherein the projections on the first latch members define cam surfaces configured such that when the first latch members are slid away from each other to engage the receptacles, the cam surfaces engage surfaces in the receptacles such that a force is exerted on the latch members in a direction urging the inner door inwardly toward the interior of the inner enclosure so as to facilitate sealing of the inner door.

24. A passive thermal control enclosure comprising:
   an inner enclosure;
   an outer enclosure surrounding the inner enclosure such that a space exists between the inner enclosure and the outer enclosure;
   insulators disposed between the inner and outer enclosures; and
   sealed packs of phase change material disposed within the inner enclosure for surrounding a payload to be temperature-controlled, the phase change material comprising deuterium oxide.

25. A method for transporting a temperature-sensitive payload between earth and a spacecraft in orbit about earth and for storing the payload on the spacecraft, comprising:
   placing the payload in a passive thermal control enclosure containing sealed packs of phase change material having a phase transition temperature generally corresponding to a temperature at which the payload is to be maintained;
   transporting the passive thermal control enclosure containing the packs of phase change material and the payload to the spacecraft and transferring the passive thermal control enclosure to a storage area in the spacecraft; and
   when a substantial fraction of the phase change material has changed phase, removing the packs of phase change material from the passive thermal control enclosure and inserting fresh packs of the phase change material into the enclosure.

26. The method of claim 25, wherein the packs of phase change material are initially placed into the thermal control enclosure in a frozen state and are removed when a substantial fraction of the phase change material has melted, and further comprising re-freezing the melted packs of phase change material onboard the spacecraft.

27. The method of claim 26, wherein the step of re-freezing the packs of phase change material comprises cooling each pack such that the phase change material freezes along a freeze front that travels in substantially only one direction.

28. The method of claim 27, wherein the step of re-freezing each pack of phase change material comprises cooling one face of the pack at one end thereof and thermally insulating all other faces of the pack such that the freeze front travels from the one end of the pack toward an opposite end thereof.

29. The method of claim 26, wherein the phase change material is packaged in flexible packages to accommodate expansion of the phase change material during re-freezing.

30. The method of claim 26, wherein the packs of phase change material placed into the passive thermal control enclosure comprise packs of water to which a nucleating agent is added to prevent supercooling of the water during re-freezing.

31. The method of claim 30, wherein the water is degassed and is then packaged in the packs, and the packs are sealed and formed of a material selected to prevent infiltration of gas back into the water.

* * * * *